Patented July 26, 1932

1,868,547

UNITED STATES PATENT OFFICE

ALBERT F. STEVENSON, OF RIDGEWOOD, NEW JERSEY, ASSIGNOR TO THE BORDEN COMPANY, OF NEW YORK, N. Y., A CORPORATION OF NEW JERSEY

MANUFACTURE OF CHEESE

No Drawing. Application filed September 30, 1925. Serial No. 59,538.

The invention relates to an improvement in the manufacture of cheese and to the improved product thereof.

The packing of cheese in air tight cans so that the cheese may be kept on the shelves of stores and sold like other canned foods without the necessity of keeping the cheese in a refrigerator has not been wholly successful up to the present time. It has been found that as a result of the present methods of manufacture and packing, the butter fats tend to separate from the body of the cheese and to collect in the bottom of the cans. This separation of the butter fat from the body of the cheese takes place and is commonly noticed when the cheese is kept in a room where the atmospheric temperature approaches 70° F. or over. The separation of the butter fats from the body portion of the cheese of course destroys its quality, lessens its food value and renders it undesirable for consumption. Moreover, if cheese as manufactured by the common processes is put up in cans it has a tendency to become moldy and rancid and so unsuitable for food. The period of time it takes the butter fats to separate from the body of the cheese and during which the molds form and grow sufficiently to spoil the cheese varies, of course, according to the atmospheric conditions under which the cheese is stored. But the fact that canned cheese manufactured and put up according to the best known processes in use at the present time does become unusable after the lapse of a greater or less period of time by reason of the separation of the butter fats and the growth of undesired molds prevents such cheese from becoming a staple and reliable article on the shelves of groceries and other stores.

The object of the present invention is to produce a canned cheese having all the quality and flavor of high grade uncanned cheese which will keep indefinitely at atmospheric temperatures without deterioration or loss of quality. To this end one of the features of the invention is to produce the cheese by a process which effectually prevents the butter fats from separating from the body of the cheese regardless of the length of time the cheese remains in the can and regardless of the temperature at which the cheese is kept. Another feature of the invention is the packaging or canning of the improved cheese in such a way as to effectually prevent the growth of the spores which produce the deleterious molds. The improved process of manufacturing and packaging cheese is fully described hereinafter and is particularly pointed out in the appended claims.

The invention is equally well adapted for application to the production of various kinds and varieties of cheese, and is therefore not to be restricted to the production of any one kind. For the sake of simplicity of description, however, and a more ready understanding of the invention, I shall describe it as applied to the production and canning of cheese of the Cheddar variety, since the process of making this cheese is typical in its main features of the processes of making other cheeses and it is universally consumed.

The milk from which the improved cheese is to be made may be either pasteurized or not according to the practice and conditions prevailing at the locality where the present process of making cheese is practiced. In either case the effect upon the quality and keeping properties of the cheese will be the same. Accordingly, the pasteurization or sterilization of the milk to be converted into cheese by the present process may or may not constitute a step in the treatment of the milk in converting it into cheese.

In practicing the present process of making cheese, the fluid milk to be converted into cheese is first treated so as to stabilize the butter fats. In stabilized milk, the butter fats (or cream) do not rise to the top or otherwise separate from the rest of the milk, but remain intimately mixed with the other ingredients of the milk so that the latter remains indefinitely as a true and stable emulsion. The stabilization of the butter fats in the fluid milk may be effected in any appropriate manner, but preferably by forcing the milk through a very small aperture under high pressure. This treatment of the milk is known in the trade as homogenizing the milk. I have found that when homogenized milk is subjected to the usual steps of converting fluid milk into curds and whey, practically all of the butter fats remain in the body part of the milk mixed or associated with the casein and are contained in the curds, so that only a very small proportion of the butter fats pass into the whey. It is well known that in all the cheese making processes in use at the present time, the whey contains so large a proportion of butter fats that it is a constant problem whether to feed the whey to hogs or to put it through a whey separator to recover the butter fats which are then churned into butter. In fact such is the loss of butter fat in the whey that it is necessary to add to some grades of milk enough cream to compensate for the loss of butter fat carried off in the whey. The average content of butter fat in the whey produced in cheese making processes as at present practiced is about seven and one-half per cent of the original quantity of butter fats contained in the milk, whereas the whey drawn from the curds produced by my process contains only about one-half of one per cent of the original butter fats.

The pressure under which the fluid milk is forced through the homogenizer must be so regulated that the ripened cheese will contain the proper amount of moisture. If the pressure is too high the moisture in the cheese will be excessive; and on the other hand, if the pressure is too low the butter fats will tend to separate from the body portion of the cheese after it has stood for a greater or less length of time depending on atmospheric conditions. I have found that for the best results both with respect to the proper amount of moisture in the cheese and with respect to preventing the butter fats from separating from the body part of the cheese, it is desirable to force the milk through the homogenizer at about twenty-five hundred pounds per square inch.

When the milk has thus been properly stabilized by homogenizing it under the requisite pressure, the milk is subjected to the usual treatment to convert it into curds and whey. After the whey has drained from the curds, the partially dried curds are placed in the presses to complete the separation of the whey adhering to surfaces of the curds.

The usual methods of pressing the curds may be employed. These consist in enclosing a given quantity of the curds in cheesecloth and placing them in open ended cylindrical boxes having movable covers or end pieces. These boxes are usually about two feet in diameter and nine to ten inches in depth. A whole series of them may be placed in the press at one time. Inasmuch, however, as the improved cheese produced by the present process is intended for sale in cylindrical tin cans of about four or five inches in diameter, I prefer to enclose the curds in cylindrical containers of the size of the tin cans in which the cheese is to be packed. There is a retail trade demand for cheese in one, two and five pound packages, and it has been found desirable to cater to this demand by putting up the cheese in packages of these weights. If the demand was for packages of other weights, of course the trade would be supplied with packages of the desired weights. In pressing the curds to express the whey adhering to the surfaces of the curds, the curds may be placed in cylindrical containers of one, two and five pound capacities. It is sometimes found convenient, however, to put the curds in a long container of the requisite diameter and then to cut off from the long cylindrical bar of pressed curds pieces of the required lengths.

Pressing the curds forms them into compact, cheeselike masses which are known as green or uncured cheese. Throughout the descriptive portion and the claims of the present specification the term "cheese" will be used as a general term to designate the cheese at any stage in the process from the time it is taken from the press to the time it is a completely cured or ripened cheese. Where it is necessary to differentiate between the cheese in its green or uncured state, or at any particular point during the curing or ripening step, or when the cheese is fully cured or ripened, appropriate adjectives will be used. Where no adjectives are used with the word "cheese" it will be understood from the context what the state or condition of the cheese is when it is referred to. It is believed that this terminology is in accord with the common practice in the art and in the literature on cheese making, and that consequently no ambiguity or confusion will result.

The green or uncured cheese taken from the press has heretofore, in the making of Cheddar cheese, been placed on shelves or racks in a room kept at the requisite degree of temperature and moisture and allowed to remain for three or four months or until fully ripened. Usually the cheeses are turned once or twice during the ripening process and are sometimes rubbed with water. During the curing or ripening process, as at present practiced, the cheese loses about five per cent of its weight in moisture and a thick rind forms over the whole cheese which is about five per cent of the remaining volume. One of the novel features of my improved process of making cheese is the step of curing or ripening the cheese so as to prevent the loss of moisture and the formation of a rind. Thus I effect a saving both to the manufacturer and to the consumer.

According to the present improved method or process of making cheese, the step of curing or ripening the cheese is effected by enclosing the green or unripened cheese in an air tight container, such as a chamber or tin can, from which the air has been extracted and into which an inert gas, such as carbon dioxide or nitrogen, has been admitted. The air may be exhausted from the container and the carbon dioxide, nitrogen, or other inert gas substituted for it before the cheese is introduced into the container, or the cheese may be placed in the container, the air then extracted and the inert gas admitted. Or again the cheese may be introduced with the inert gas into the container from which the air has been exhausted. The practice of any one of these three methods gives satisfactory results and the precise method chosen will depend upon mechanical considerations rather than upon the results to be obtained by its use.

The chamber or other receptacle in which the green or uncured cheese is placed to be ripened in the presence of the inert gas may be either a room adapted to hold many cheeses or it may be a single container or can in which the cheese is to be sold. In either case the conditions for ripening the cheese are the same and the effects on the cheese are the same. Whether a relatively great quantity of cheese will be cured in one room or whether the green cheese will be cut into the proper sizes and enclosed in tin cans will depend upon the conditions of production at the time the cheese is made. When it is considered necessary to ripen large quantities of cheese in a room the cheese may remain in the room until completely ripened or it may be taken from the room at any stage during the curing or ripening step and packed with the inert gas in air-tight cans in which the process of ripening will continue. Whether the cheese is immediately packed in the cans or is permitted to partially or fully ripen in a curing room the absence of atmospheric air and the presence of the inert gas prevents moisture from evaporating from the cheese and also prevents the formation of a rind.

The step of curing or ripening cheese described above and which constitutes one of the features of the present invention, is not to be restricted to cheese produced from milk in which the fat globules are put in a stable condition previous to the addition of the rennet, but may also be used for ripening cheese produced by the processes now in common use. By using the cheese curing or ripening step of the present invention with cheese produced by present methods a saving is effected in that no rind will be formed on the cheese and there will be no evaporation of moisture and consequently no loss of weight. Cheese so cured may then be placed with the inert gas in an air-tight can or other container from which the air has been exhausted. Or as in the case with cheese made from homogenized milk according to the method of the present invention, the green or uncured cheese as it comes from the press may be enclosed with the inert gas in the air-tight can or other container from which the air has been exhausted and permitted to ripen therein in the presence of the inert gas.

The use of an inert gas in which to cure or ripen the cheese absolutely prevents the growth and development of deleterious or harmful molds. The inert gases most available and best adapted for this purpose are carbon dioxide and nitrogen, although other inert gases, such as hydrogen and vaporized water may be used. Many organic gases may also be used. Whether carbon dioxide or nitrogen shall be used will depend upon the availability and cheapness of these gases in the locality in which the process is practiced. It is not considered necessary or desirable to discuss the theory of what takes place during the ripening of the cheese to convert the compressed mass of curds into a fully ripened cheese. The same curing or ripening process goes on when the green or uncured cheese is enclosed with an inert gas in an air tight chamber as when the cheese is allowed to ripen in the air. The presence of the inert gas and the absence of oxygen does not interfere with the growth and development of the enzymes or organisms which convert the curds or green cheese into the ripened cheese, but the absence of oxygen does prevent the growth and development of deleterious mold spores. Keeping the cheese with an inert gas in a hermetically sealed chamber or other receptacle, whether a curing room or the tin can in which the cheese is to be sold, prevents moisture from evaporating from the surface of the cheese and thereby prevents the formation of rind. By properly regulating the aperture through which the milk is forced in the homogenizing machine the moisture to be retained in the fully ripened cheese can be properly controlled. The moisture which exudes from the cheese mass to the surface thereof, by not evaporating, keeps the surface of the cheese in a moist or fresh condition.

It will be recognized by those skilled in the cheese making art that none of the steps of the present process can destroy the cultures which produce a fine grained, creamy-textured cheese of the highest quality and flavor. Treating the milk to break up the globules of butter fat so as to put them in a stable condition in the milk, if it has any other effect than to prevent the butter fats from separating from the body of the cheese when it is kept at room temperatures for indefinite periods, has the effect of imparting to the ripened cheese a creamy texture. The test for this is, of course, to take a portion of the cheese between the thumb and forefinger and to slowly abrade it. When a piece of ripened cheese produced by the present process is taken between the thumb and the forefinger and slowly abraded, it will be found that it converts into a creamy or buttery consistency. By preventing the development and growth of deleterious molds or other organisms on or in the cheese, the cheese may be kept in its air tight cans or containers for indefinite periods of time without appreciably losing any of the qualities which make it a cheese of the first order. As a result the cheese of the present invention may be handled and sold like other canned commodities by grocers and others.

It will be understood that the present invention deals only with the production of cheese in the strictest sense of the word as distinguished from processed or sterilized cheese. The cheese of the present invention like the article known as cheese for hundreds of years is the food product resulting from treating sweet whole milk with rennet or the like to convert it into curds and whey, compressing the curds, and then allowing the curds to ripen into cheese by the action of the enzymes contained in the curds. The article of food thus produced is essentially different from the article of food produced by processing ordinary cheese to impart to it certain desired characteristics. The methods of producing these treated cheeses always start by removing the rind from the ordinary cheese cured or ripened by the processes of nature. The present invention starts with the whole milk and ends with the cheese which has been cured or ripened without the formation of a rind and is of the same texture on its outer surface as it is throughout its mass. Where it is necessary in the claims to avoid ambiguity I use the term "untreated cheese" to distinguish the cheese of the present invention from treated or processed cheese.

Having thus described the invention what I claim as new is:—

1. The process of making cheese which consists in homogenizing the milk, converting the homogenized milk into curds, expressing the whey from the curds, enclosing the curds surrounded by an inert gas in an air-tight container from which the air has been extracted, and permitting the curds to remain in the container until they ripen to cheese.

2. The process of making cheese which consists in treating the milk so as to prevent the particles of butter fat from separating from the body of the milk, converting the milk so treated into curds, expressing the whey from the curds, enclosing the curds in an air-tight container from which the air has been withdrawn, and permitting the curds to remain in the container until they ripen into cheese.

3. The process of making cheese which consists in homogenizing the milk, converting the homogenized milk into curds, expressing the whey from the curds, surrounding the curds with an inert gas, and permitting the curds to remain in the inert gas until ripened into cheese.

4. In the process of making cheese including converting the milk into curds and expressing the whey from the curds, the step of enclosing the curds in an atmosphere of inert gas and permitting them to remain therein until ripened into cheese.

5. In the process of making cheese the step which consists in ripening the cheese while preventing the formation of a rind on its outer surface by excluding atmospheric air from the cheese during the ripening process.

6. The process of making cheese which consists in forming curds, expressing the whey from the curds, and converting the curds into ripened cheese while preventing a rind from forming on the cheese during the ripening process by excluding atmospheric air from the cheese.

7. The process of making cheese which consists in homogenizing the milk, converting the homogenized milk into curds, expressing the whey from the curds, and then ripening the curds into cheese.

ALBERT F. STEVENSON.